(12) United States Patent
Kasaoki

(10) Patent No.: US 9,349,070 B2
(45) Date of Patent: May 24, 2016

(54) VEHICLE EXTERNAL ENVIRONMENT RECOGNITION DEVICE

(71) Applicant: FUJI JUKOGYO KABUSHIKI KAISHA, Tokyo (JP)

(72) Inventor: Seisuke Kasaoki, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 14/477,352

(22) Filed: Sep. 4, 2014

(65) Prior Publication Data

US 2015/0092989 A1 Apr. 2, 2015

(30) Foreign Application Priority Data

Sep. 27, 2013 (JP) ................................. 2013-202629

(51) Int. Cl.
*G06K 9/00* (2006.01)
*G06K 9/46* (2006.01)
*G06T 7/00* (2006.01)

(52) U.S. Cl.
CPC .......... *G06K 9/4661* (2013.01); *G06K 9/00805* (2013.01); *G06K 9/4604* (2013.01); *G06T 7/004* (2013.01); *G06T 7/0042* (2013.01); *G06T 2207/10021* (2013.01); *G06T 2207/30261* (2013.01)

(58) Field of Classification Search
None
See application file for complete search history.

(56) References Cited

U.S. PATENT DOCUMENTS

| 2005/0063565 | A1* | 3/2005 | Nagaoka | B60R 21/013 382/104 |
| 2011/0135200 | A1* | 6/2011 | Chen | G06T 5/003 382/167 |
| 2012/0133739 | A1* | 5/2012 | Morimitsu | G01B 11/24 348/46 |
| 2012/0294482 | A1* | 11/2012 | Kasaoki | G06K 9/4647 382/103 |
| 2013/0235201 | A1* | 9/2013 | Kiyohara | G06K 9/00805 348/148 |

FOREIGN PATENT DOCUMENTS

| JP | 3349060 B2 | 11/2002 |
| JP | 2009-110168 A | 5/2009 |
| JP | 2010-224925 A | 10/2010 |
| JP | 2012-243049 A | 12/2012 |

* cited by examiner

*Primary Examiner* — Bhavesh Mehta
*Assistant Examiner* — Narek Zohrabyan
(74) *Attorney, Agent, or Firm* — McDermott Will & Emery LLP

(57) ABSTRACT

A vehicle external environment recognition device includes a three-dimensional position deriving module that derives three-dimensional positions in real space of subject parts in images that are obtained by imaging a detection area, an object identifying module that groups the subject parts of which differences in the three-dimensional position are within a predetermined range to identify an object, an edge intensity deriving module that horizontally divides an area containing the object to set divided areas, and derives an edge average that is an average value of edge intensities based on a luminance value of each pixel within each of the divided areas; and a floating matter identifying module that compares the edge average with a predetermined threshold, and identifies the object to be likely floating matters when the edge average is less than the threshold.

12 Claims, 9 Drawing Sheets

VEHICLE EXTERNAL ENVIRONMENT RECOGNITION DEVICE

CROSS-REFERENCE TO RELATED APPLICATION

The present application claims priority from Japanese Patent Application No. 2013-202629 filed on Sep. 27, 2013, the entire contents of which are hereby incorporated by reference.

BACKGROUND

1. Technical Field

The present disclosure relates to a vehicle external environment recognition device that identifies a specific object to which an object existing within a detection area corresponds.

2. Related Art

There are conventionally known a technique, such as collision avoidance control, which detects specific objects including another vehicle located ahead of a vehicle and avoids a collision with a leading vehicle, and a technique, such as a cruise control, which controls so as to maintain an inter-vehicle distance with a leading vehicle at a safe distance (for instance, see Japanese Patent No. 3,349,060 and Japanese Unexamined Patent Application Publication (JP-A) No. 2010-224925).

Especially in cold weather and/or high altitude locations, a lump of steam may be floating on the road surface or white exhaust gas may be discharged from an exhaust pipe of the leading vehicle, and they may remain still without spreading immediately. When the above conventional control techniques are used, the floating matters, such as steam and exhaust gas, are misjudged to be specific objects, such as a vehicle and a pedestrian, whereby a stopping control or a slowdown control may be actuated to avoid the specific objects.

For this reason, for example, JP-A No. 2009-110168 discloses a technique that calculates an average of distances of parts of a detected object and calculates variations (distributions) in the distances of the object parts with respect to the average to determine that the detected object is the floating matters, such as steam and exhaust gas, which the vehicle will be safe to collide if the variations exceed a threshold. Moreover, for example, JP-A No. 2012-243049 discloses a technique that groups subject parts located within a detection area as one object based on relative distances of the subject parts, and determine whether the object is white floating matters based on any one or more of characteristic amounts, such as an average value, a variance, a skewness, and a kurtosis of luminance, obtained from a histogram of luminance of the object.

However, for example, in a windless condition, the floating matters such as steam and exhaust gas may remain still (stay) on the road surface. In such a case, since the variation in distance of parts of the floating matters becomes small, it is difficult to distinguish between the floating matters and the specific objects by the technique disclosed in JP-A No. 2009-110168. Further, because the distributions in distance of the floating matters may have a wide variety of patterns, the distributions in distance which are typical characteristics of the floating matters cannot be recognized exactly only based on the variations, resulting in a comparatively low detection accuracy of the floating matters.

Further, for example, if colored lights of traffic lights and/or streetlights reflect on the floating matters to glow the floating matters in the illuminated colors, the detection accuracy of the floating matters cannot be improved only by the technique of determining the color of white as disclosed in JP-A No. 2012-243049.

SUMMARY OF THE INVENTION

The present disclosure has been designed in consideration of the circumstances described above, and an object thereof is to provide a vehicle external environment recognition device which can accurately detect floating matters such as steam and exhaust gas.

One aspect of the present disclosure provides a vehicle external environment recognition device including: a three-dimensional position deriving module that derives three-dimensional positions in real space of subject parts in an image obtained by imaging a detection area; an object identifying module that groups the subject parts of which differences in the three-dimensional position are within a predetermined range to identify an object; an edge intensity deriving module that horizontally divides an area containing the object to set divided areas, and derives an edge average that is an average value of edge intensities based on a luminance value of each pixel within each of the divided areas; and a floating matter identifying module that compares the edge average with a predetermined threshold, and identifies the object to be likely floating matters when the edge average is less than the threshold.

The edge intensity deriving module may derive the edge average based on the luminance value of each pixel within predetermined judgment parts that are set within the divided area. The predetermined judgment parts may be continuous in horizontal directions and offset toward a horizontal end side of the object, while being equally separated from each other in vertical directions.

Each of the judgment parts may be a pixel. The edge intensity deriving module may derive the edge intensity using a Laplacian filter of a pixel corresponding to the judgment part and two adjacent pixels adjacent to the judgment part on the left side and two adjacent pixels adjacent to the judgment part on the right side, the judgment parts being continuous in horizontal directions.

The edge intensity deriving module may derive the edge average per frame, and concludes a median of the edge averages of three consecutive frames that is calculated using median filters, to be the edge average to be used by the floating matter identifying module.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, a suitable example of the present disclosure will be described in detail with reference to the accompanying drawings. Note that dimensions, materials, particular numerical values, etc. illustrated in this example are merely instances for easier understandings of the present disclosure, and these instances are not intended to limit the present disclosure unless otherwise particularly described. Note that, in this description and the accompanying drawings, elements having substantially the same functions and configurations are denoted with same numerals to omit redundant explanation, and illustration of elements which are not directly related to the present disclosure is omitted herein.

In recent years, vehicles having so-called a collision avoidance function (adaptive cruise control: ACC) have been widely spreading. This function images the road environment ahead of a vehicle by on-board cameras mounted to the vehicle, identifies objects, such as leading vehicles, based on color information and/or positional information within the image to avoid a collision with the identified object, and/or maintains an inter-vehicle distance with the leading vehicle at a safe distance. However, when the object is simply identified using the images, floating matters which remain still on a road surface, such as steam and exhaust gas, may be erroneously recognized as a specific object such as a vehicle and a pedestrian.

Although the floating matters may be identified based on the variation in distance and/or the whiteness specific to the floating matters like the conventional technique, the accuracy of identification may not be improved if the variation in distance is small in a windless condition or if colors of traffic lights and/or streetlights reflect on the floating matters and thus the floating matters appear not to be whiten. Thus, this example notes the fact that the floating matters vary simple in color therethrough, in other words, they have less color variation patterns and, thus, intensities of an edge (luminance differences) are comparatively low with respect to other normal specific objects. One purpose of this example is to detect the floating matters based on the edge intensities. Below, an environment recognition system to achieve such a purpose will be described, and a vehicle external environment recognition device which is one of components of the system will particularly be described in detail as well.

(Environment Recognition System 100)

Figure 1:
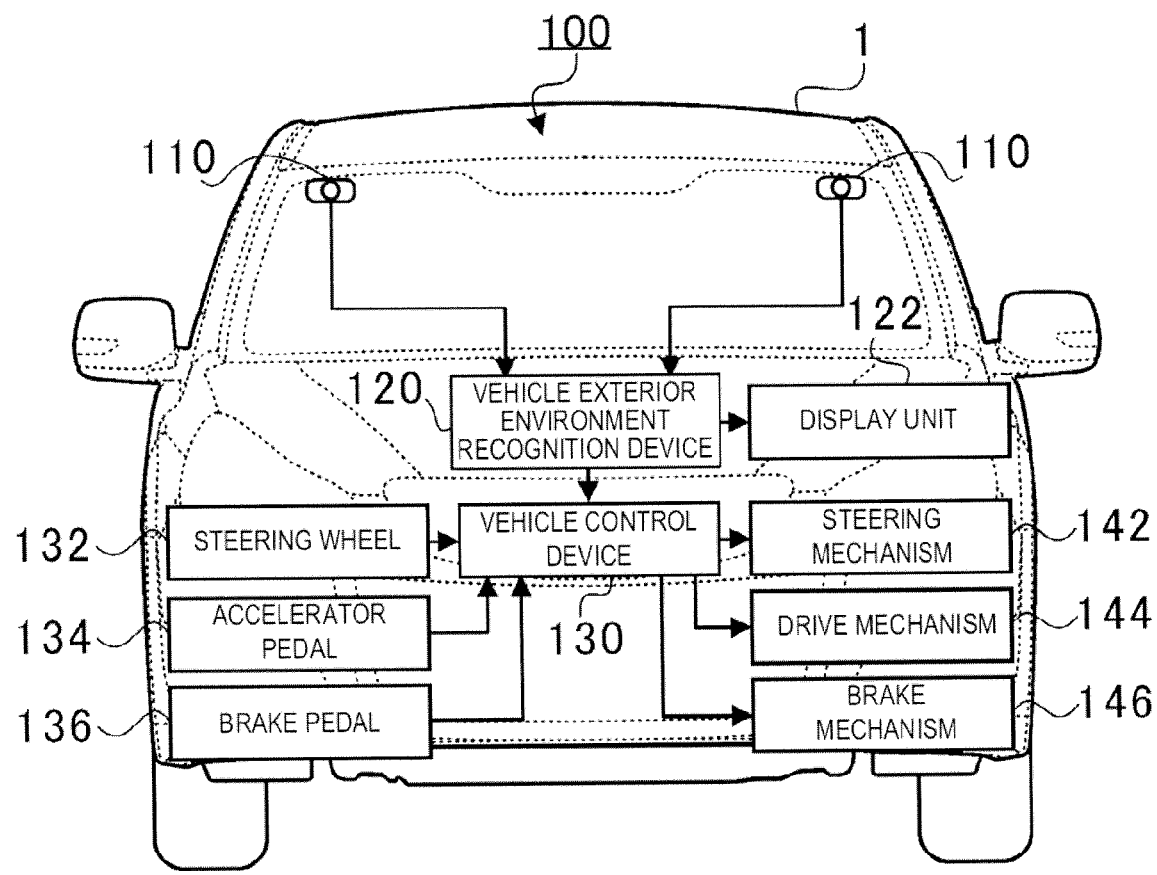
FIG. 1 is a block diagram illustrating a connecting relation of an environment recognition system.

FIG. 1 is a block diagram illustrating a connecting relation of an environment recognition system 100. The environment recognition system 100 includes a pair of imaging devices 110, a vehicle exterior environment recognition device 120, and a vehicle control device 130 (which is typically comprised of an erectronic control unit (ECU)), which are all provided inside a vehicle 1 (hereinafter, simply referred to as "the vehicle").

Each imaging device 110 is comprised of image sensor elements, such as charge-coupled devices (CCDs) or complementary metal-oxide semiconductors (CMOSs). The imaging device 110 can image the environment ahead of the vehicle 1 to generate a color image or a monochrome image consisting of three hues (R (red), G (green), and B (blue)). Here, the color image imaged by the imaging device 110 is referred to as luminance image and distinguished from a distance image described later.

The two imaging devices 110 are laterally disposed so as to be separated from each other so that optical axes of the imaging devices 110 are oriented substantially parallel to each other and toward a traveling direction of the vehicle 1. Each imaging device 110 sequentially generates image data (i.e., a frame) which is obtained by imaging object(s) existing in a detection area ahead of the vehicle 1 per frame at every ¹⁄₆₀ seconds (i.e., 60 fps). Note that the objects to be recognized include a solid object that exists independently, such as another vehicle, a pedestrian, a traffic light, a road (course), a guardrail and a building, as well as an object which can be identified as part of the solid object, such as a taillight, a blinker, each light emitting part of the traffic light. Each functional module described below carries out each processing for every frame, triggered at refreshing of such image data.

The vehicle exterior environment recognition device 120 acquires the image data from each of the two imaging devices 110, derives a parallax using so-called pattern matching, associates the derived parallax information (corresponding to a depth distance described later) with the image data to generate the distance image. The luminance image and the distance image will be described later in detail. The vehicle exterior environment recognition device 120 identifies a specific object to which an object within the detection area ahead of the vehicle 1 corresponds, by using the luminance of the object based on the luminance image and the depth distance of the object from the vehicle 1 based on the distance image.

When the vehicle exterior environment recognition device 120 identifies the specific object (for example, a leading vehicle), it determines whether the possibility of the specific object colliding with the vehicle 1 is high, while tracking the specific object. Here, when the vehicle exterior environment recognition device 120 determines that the possibility of a collision is high, the vehicle exterior environment recognition device 120 then gives (informs) a vehicle operator a warning indication of the possibility through a display unit 122 installed in front of the operator, and outputs information indicative of the possibility to the vehicle control device 130.

The vehicle control device 130 receives operational inputs by the operator through a steering wheel 132, an accelerator (or a gas pedal) 134, and a brake pedal 136, and then controls the vehicle 1 by transmitting the received inputs to a steering mechanism 142, a drive mechanism 144, and a brake mechanism 146, respectively. The vehicle control device 130 also controls the drive mechanism 144 and the brake mechanism 146 according to instructions from the vehicle exterior environment recognition device 120.

Hereinafter, a configuration of the vehicle exterior environment recognition device 120 will be described in detail. Note that only procedures of identifying an object to be floating matters, which are the feature of this example, are described herein in detail and, thus, description of other configurations which are not related to the feature of this example is omitted.

(Vehicle Exterior Environment Recognition Device 120)

Figure 2:
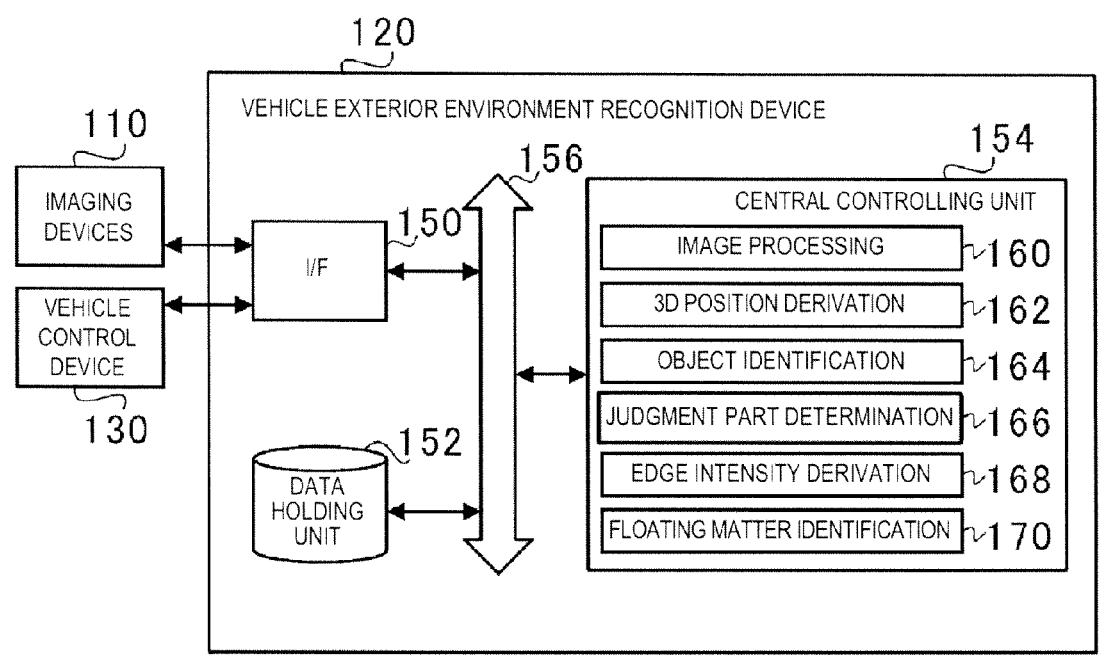
FIG. 2 is a functional block diagram schematically illustrating functions of a vehicle external environment recognition device.

FIG. 2 is a functional block diagram schematically illustrating the functions of the vehicle exterior environment recognition device 120. As illustrated in FIG. 2, the vehicle exterior environment recognition device 120 is comprised of an interface (I/F) unit 150, a data holding unit 152, and a central controlling unit 154.

The I/F unit 150 is an interface that performs bidirectional information exchanges with the imaging devices 110 and/or the vehicle control device 130. The data holding unit 152 is comprised of one or more RAMs, one or more flash memories, one or more HDDs, etc. The data holding unit 152 holds various information required for the processing of each functional module described below. In addition, the data holding unit 152 temporarily holds the image data received from the imaging devices 110.

The central controlling unit 154 is comprised of one or more integrated circuit including one or more central processing units (CPUs), one or more ROMs where one or more programs or the like are stored, one or more RAMs or the like as work areas. The central controlling unit 154 controls, for instance, the I/F unit 150, the data holding unit 152, etc. through a system bus 156. In addition, the central controlling unit 154 of this example also functions as an image processing module 160, a three-dimensional (3D) position deriving module 162, an object identifying module 164, a judgment part determining module 166, an edge intensity deriving module 168, and a floating matter identifying module 170. Next, detailed operations will be described in order of the image processing, the object identification processing, and the floating matter identification processing, based on the general purposes of such functional modules.

(Image Processing)

The image processing module 160 acquires the image data from each of the two imaging devices 110 and extracts any one of blocks (for example, each block has a matrix of 4 pixels in horizontal directions×4 pixels in vertical directions) from the image data generated by one of the imaging devices 110 and then searches a block in the image data generated by the other imaging device 110, which corresponds to the extracted block. By using so-called pattern matching, the image processing module 160 derives the parallax. Note that the term "horizontal" as used herein may refer to lateral directions of a screen surface, and the term "vertical" as used herein may refer to vertical directions of the screen surface, perpendicular to the horizontal directions.

The pattern matching may include comparisons between the two pieces of image data in luminance (Y color-difference signals) for every block which represents any one of image locations. Specifically, the pattern matching may be techniques, such as SAD (Sum of Absolute Difference) in which differences in luminance are calculated, SSD (Sum of Squared intensity Difference) in which the differences are squared before being used, and NCC (Normalized Cross Correlation) in which similarities of variances which are obtained by subtracting an average value of the luminance of the pixels from the luminance of each pixel. The image processing module 160 performs such block-by-block parallax derivation processing for all the blocks which correspond to the detection area (for example, 600 pixels in the horizontal directions×180 pixels in the vertical directions). Note that the block has a matrix of 4 pixels in the horizontal directions×4 pixels in the vertical directions in this example; however, each block may contain any number of pixels.

Note that the image processing module 160 can derive the parallax for every block which corresponds to the smallest unit of detection resolution; however, it cannot recognize what part of what the block corresponds to. For this reason, the parallax information is independently derived not per object but per detection resolution (for example, per block) in the detection area. Note that the term "distance image" as used herein refers to the image that is obtained by associating the image data with the parallax information (corresponding to the depth distance described later) derived by the above-described way.

Figure 3A:
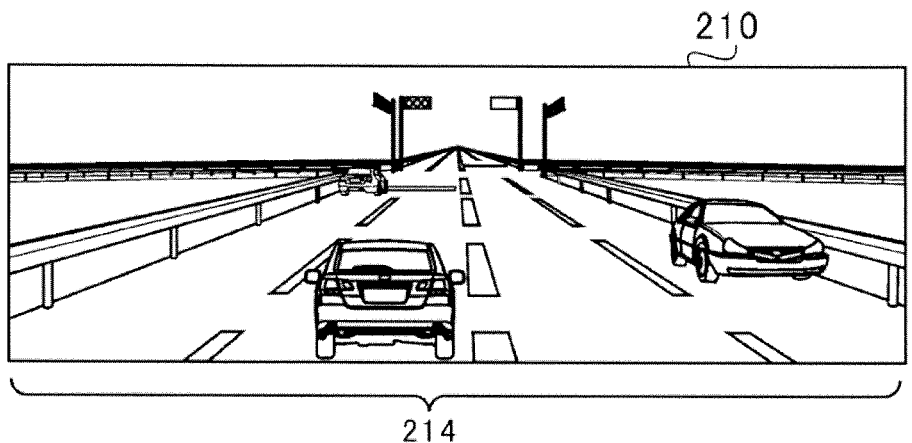
FIGS. 3A and 3B are diagrams illustrating a luminance image and a distance image, respectively.
Figure 3B:
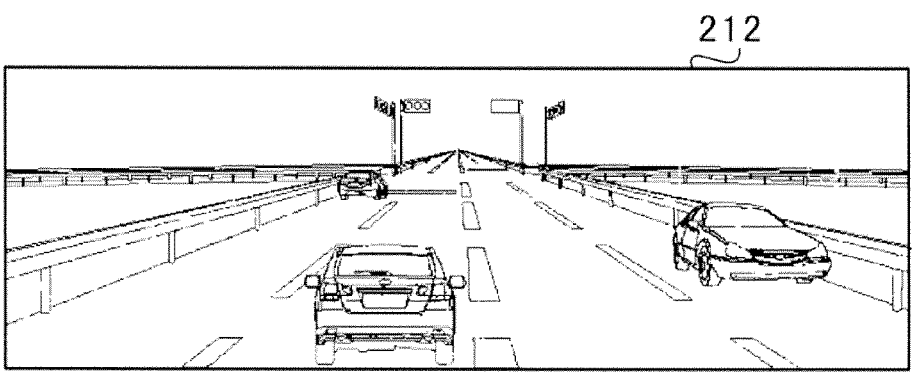

FIGS. 3A and 3B are diagrams illustrating a luminance image 210 and a distance image 212, respectively. For example, suppose that the luminance images 210 (image data) corresponding to a detection area 214 are generated through the two imaging devices 110. For easier understanding, as illustrated in FIG. 3A, only one of the two luminance images 210 generated by the imaging devices 110 is schematically illustrated. In this example, the image processing module 160 calculates the parallax for every block from such luminance images 210 and forms the distance image 212 as illustrated in FIG. 3B. The parallax is associated with each corresponding block in the distance image 212. For convenience of explanation, the blocks for which the parallaxes are derived are represented by black dots.

Returning to FIG. 2, the 3D position deriving module 162 converts the parallax information for every block in the detection area 214 into three-dimensional (3D) positional information in real space including a horizontal (lateral) distance, a height, and a depth distance, by using so-called a stereo method based on the distance image 212 generated by the image processing module 160. Note that the stereo method is to derive the depth distance of a subject part with respect to the imaging devices 110 based on the parallax of the subject part in the distance image 212 by using a triangulation method. Here, the 3D position deriving module 162 derives the height of the subject part from a road surface based on the depth distance of the subject part, and a detection distance on the distance image 212 between the subject part and a point location on the road surface at the same depth distance as the depth distance of the subject part. Then, the derived 3D positional information is again associated with the distance image 212. Since various known techniques can be applied to the derivation processing of the depth distance and/or the identification processing of the 3D position, description thereof is omitted herein.

(Object Identification Processing)

The object identifying module 164 groups the subject parts (pixels and blocks) within the detection area 214 by using the 3D positional information based on the distance image 212 to identify an object. Specifically, the object identifying module 164 selects any one of subject parts as a reference point and groups the selected subject part with other subject parts of which differences in the horizontal distance, differences in the height, and differences in the depth distance are within a predetermined range to make these subject parts to be one unitary object. Note that the predetermined range can be expressed by distances in real space, and can be set to any values (for example, 1.0 m). Further, the object identifying module 164 similarly groups the newly-added subject part by the previous grouping with other subject parts of which differences in the horizontal distance, differences in the height, and differences in the depth distance are within the predetermined range, using the newly-added subject part as a reference point. As a result, all the subject parts will be grouped as one unitary object if the distances are within the predetermined range.

(Floating Matter Identification Processing)

Next, edge intensities of the object are derived and the object is then determined whether it is floating matters based on the derived results.

The judgment part determining module 166 determines a part to be judged of the edge intensity (hereinafter, referred to as "the judgment part") for the object to be determined whether it is floating matters.

Figure 4A:
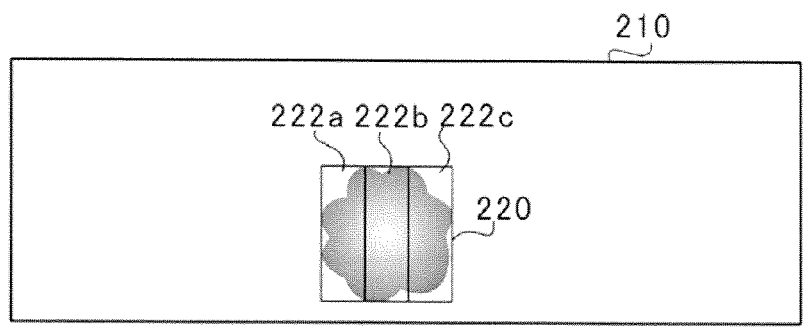
FIGS. 4A and 4B are diagrams illustrating judgment parts.
Figure 4B:
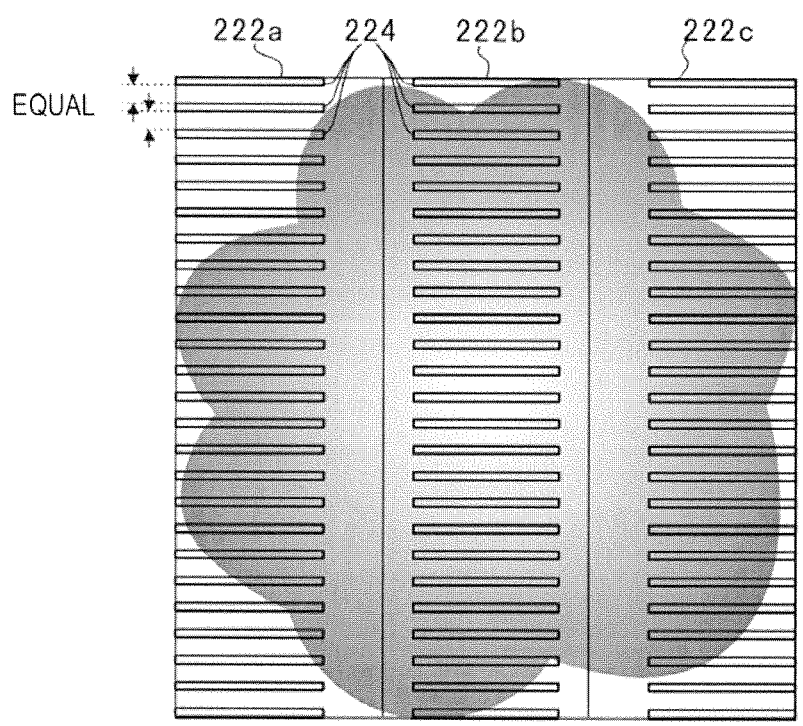

FIGS. 4A and 4B are diagrams illustrating the judgment part. As illustrated in FIG. 4A, the judgment part determining module 166 first encloses the object in a rectangle 220 so that the rectangle contains horizontal and vertical endpoints of the object, and sets areas which are obtained by horizontally and equally dividing the rectangle 220 into three parts (here, they are called as divided areas 222a, 222b and 222c from left of the screen). The following processing is performed for each of the divided areas 222a, 222b and 222c.

As illustrated in FIG. 4B, the judgment part determining module 166 sets a plurality of strips 224 (here, 25 strips) for each of the divided areas 222a, 222b and 222c. The strips 224 extend in the horizontal directions, and are located substantially equally separated from each other in the vertical directions. For example, each strip 224 has a horizontal length of 25 pixels and a vertical length of 1 pixel. Note that the strips 224 are "substantially" equally separated in the vertical directions because a fraction or remainder may be created depending on the number of pixels of the object in the vertical directions when the strips 224 are "exactly" equally separated. For example, if a vertical length of each of the divided areas 222a, 222b and 222c is 25+24×n (n is an integer), the strips 224 can be equally separated in the vertical directions with a gap of "n" pixels between adjacent strips 224; however, if the vertical length is other value, the intervals of the strips 224 will be uneven. In such a case, the intervals of the strips 224 are set so as to vary by ±1 pixel. For example, if the object has 100 pixels in the vertical directions, there are twenty four 3-pixel intervals and one 4-pixel interval. Note that any values may be selected for the numbers of pixels of each strip 224 in the horizontal directions and the vertical directions, and the number of strips 224 of each of the divided areas 222a, 222b and 222c, without limiting to the values described above.

Further, the horizontal positions of the strips 224 inside the divided areas 222a, 222b and 222c may differ among the divided areas 222a, 222b and 222c. For example, the strips 224 may be offset to a horizontal end of the object. Specifically, as illustrated in FIG. 4B, the strips 224 are formed from the left end of divided area 222a which is located at left side of the screen, the strips 224 are formed from the right end of the divided area 222c which is located at right side of the screen, and the strips 224 are formed at the horizontal center of the divided area 222b which is located at the center of the screen, so that the strips 224 in the divided areas 222a and 222c are aligned to have equal gaps from the strips 224 in the center divided area 222b. In this example, each pixel in the strips 224 thus formed serves as the judgment part. Therefore, the distribution of the luminance values of the object can be determined over the entire object in a state where the horizontal ends at which edges tends to appear are included in the determination.

The edge intensity deriving module 168 first derives luminance differences between adjacent pixels by applying Laplacian filters to the judgment part which is determined by the judgment part determining module 166, and uses the luminance differences as edge intensities.

Figure 5:
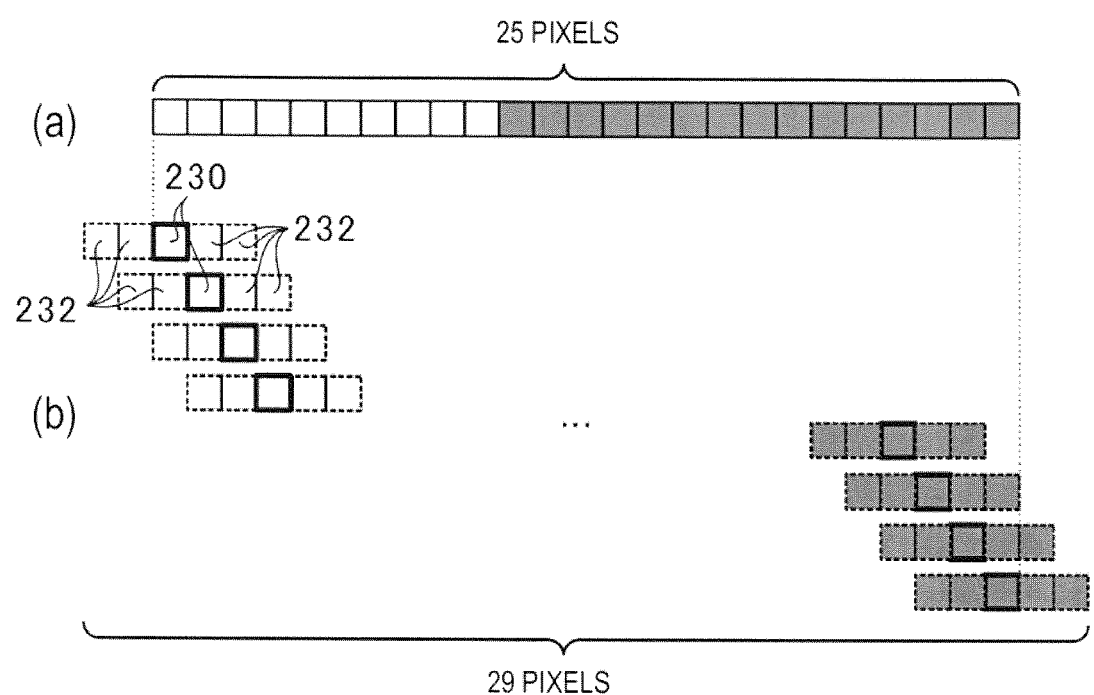
FIG. 5 is a diagram illustrating operation of an edge intensity deriving module.

FIG. 5 is a diagram illustrating operations of the edge intensity deriving module 168. Here, as illustrated in the upper part (a) of FIG. 5, one of the strips 224 illustrated in FIG. 4B is selected as an instance to describe derivation processing of the edge intensity. As illustrated in the lower part (b) of FIG. 5, the Laplacian filter in this example obtains the edge intensity of a pixel 230 corresponding to the judgment part concerned, based on the pixel 230 and two adjacent pixels 232 horizontally next to the pixel 230 on both left and right sides (i.e., two pixels 232 on the left side of the pixel 230, and two pixels 232 on the right side of the pixel 230, respectively). Therefore, as illustrated in the part (b) of FIG. 5, two additional pixels are needed on both left and right ends of one strip 224 in order to obtain the edge intensity of the judgment parts consisting of 25 pixels which continue throughout the strip 224 (i.e., total of 29 pixels are needed).

Next, the edge intensity deriving module 168 multiplies the luminance value of the pixel 230 corresponding to the judgment part by four, and then subtracts the luminance values of all the four pixels 232 (two pixels on the left and two pixels on the right side) from the multiplied luminance value of the pixel 230 (each has an effect of ×−1). According to such a calculation, the edge intensity is exaggerated if the luminance values are different between the pixel 230 corresponding to the judgment part and the adjacent four pixels 232, and, on the other hand, if the luminance values are substantially equal to each other, the edge intensity becomes a value close to zero. Such an edge intensity calculation is carried out for 1,875 times (=25 pixels×25 strips×3 divided areas). In this example, processing load and processing time can be maintained same by fixing the number of judgment parts, regardless of the size of the object.

Next, the edge intensity deriving module 168 derives an average value of the edge intensities for each of the divided areas 222a, 222b and 222c. Specifically, the edge intensity deriving module 168 integrates all the edge intensities of the judgment parts of 625 pixels (=25 pixels/strip×25 strips) contained in each of the three divided areas 222a, 222b and 222c of left, center, and right, and then divides each integrated edge intensity by the number of judgment parts (i.e., 625). Thus, one average value of the edge intensities (hereinafter, referred to as "the edge average") can be derived for each of the three divided areas 222a, 222b and 222c. The edge averages thus derived are used for a determination of floating matters.

Note that, if the edge average is simply adopted to the determination for every frame, an unpredictable edge average which should not essentially be adopted may unintentionally be reflected in the determination as it is. Thus, the edge intensity deriving module 168 of this example uses a median filter to select a median (the second smallest value or the second largest value) of the edge averages which are derived in three consecutive frames consisting of a current frame, a previous frame, and a next frame, as the edge average in the current frame. Therefore, the edge average of one frame is used for total of three times, because the edge average is used also in the previous frame and the next frame. Note that, since a starting frame of the derivation of the edge average does not have the previous frame, the edge average of only this starting frame is used as the final edge average, without using the median filter.

Thus, one edge average of the current frame is replaced by another edge average of either one of the previous or next frame even if the edge average of the current frame is an unpredictable value. Therefore, the edge averages can be obtained without any abrupt variations in their values with time.

The floating matter identifying module 170 compares, for every frame, the edge average derived by the edge intensity deriving module 168 with a predetermined threshold, and gives a point according to whether the edge average is less than a threshold, or equal to or greater than the threshold. The floating matter identifying module 170 then integrates the points. For example, if the edge average is less than the threshold, +1 point is integrated (i.e., 1 point is added), and if the edge average is equal to or greater than the threshold, −1 point is integrated (i.e., 1 point is subtracted).

Figure 6:
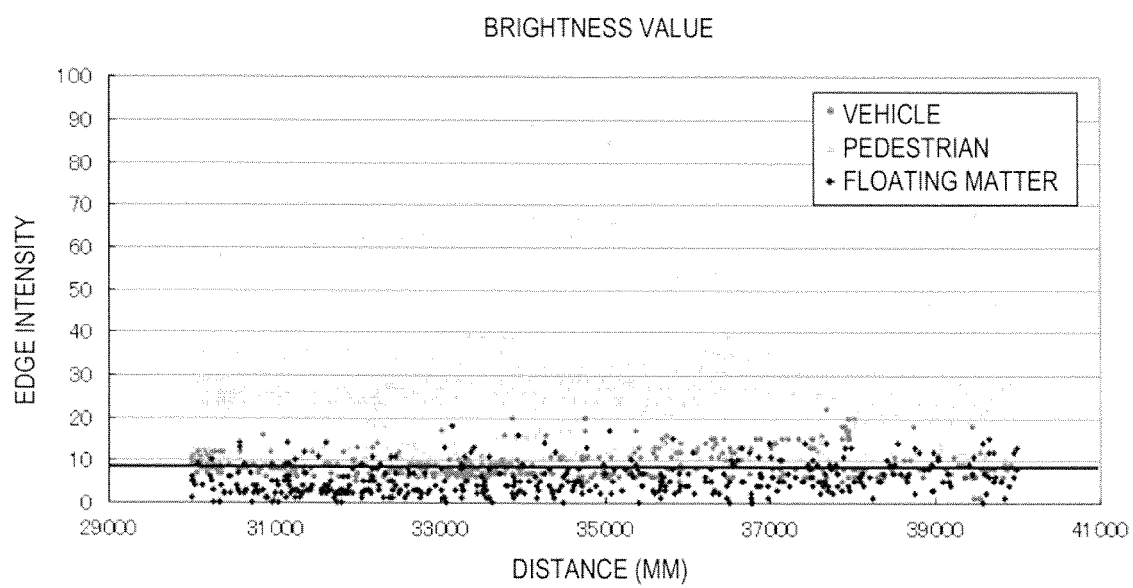
FIG. 6 is plots illustrating a threshold.

FIG. 6 is plots illustrating the threshold. Note that a center value of a difference in the edge intensity between the floating matters and a general specific object (e.g., another vehicle or a pedestrian) may be used as the threshold. For example, experimental values of the edge intensities of the depth distances of vehicles, pedestrians, and floating matters are illustrated in FIG. 6. As understood by referring to FIG. 6, the edge intensities of floating matters are comparatively smaller than the edge intensities of vehicles and pedestrians. Here, it will be possible to roughly distinguish the floating matters from the vehicles and pedestrians by setting the threshold to 8, for example. In addition, the threshold is independently provided for each of the divided areas 222a, 222b and 222c according to the characteristics of the divided areas.

Then, the floating matter identifying module 170 determines whether the integrated point is 11 points or greater. If the integrated point is 11 points or greater, the floating matter identifying module 170 determines that the object is likely the floating matters. Note that the integrated point is provided with, for example, an upper limit of 20 points and a lower limit of −10 points. Since the upper and lower limits are thus provided, an absolute value of the point will not be too large even if a time period during which the floating matters have not been detected or a time period during which the floating matters have been detected becomes long. Therefore, when the detection of the floating matters changes between that the floating matters exist and that the floating matters do not exist, the existence and the non-existence can be promptly determined.

(Method of Recognizing Vehicle External Environment)

Figure 7:
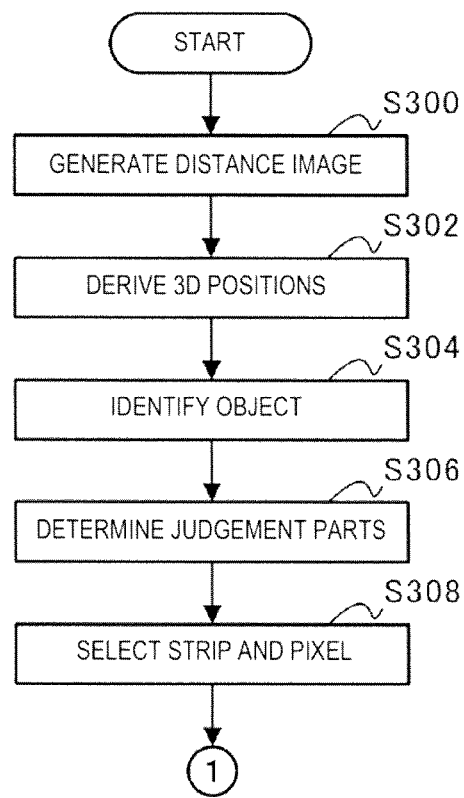
FIGS. 7 to 9 are a flowchart illustrating a flow of the entire processing of a method of recognizing a vehicle external environment.
Figure 8:
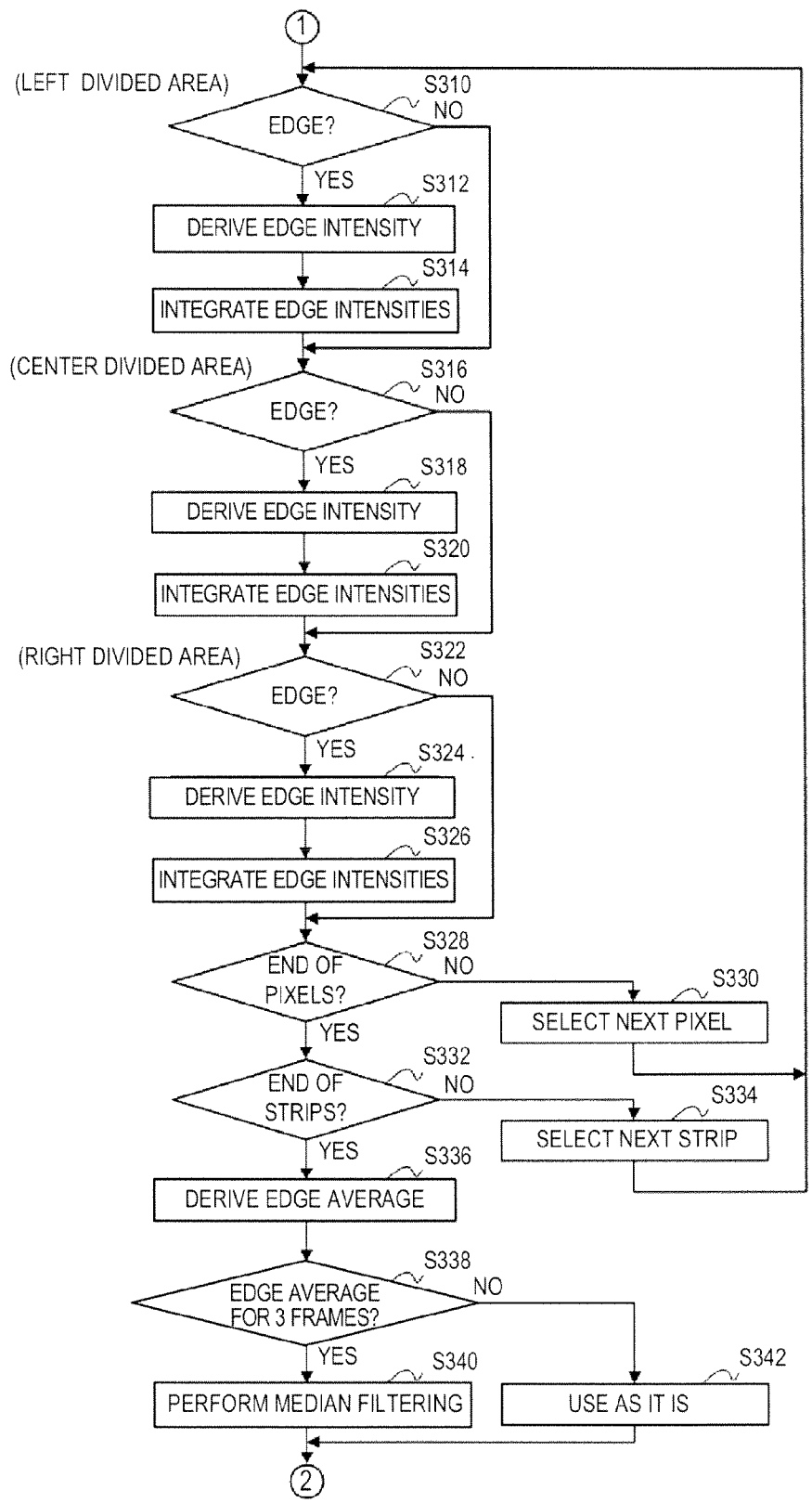
Figure 9:
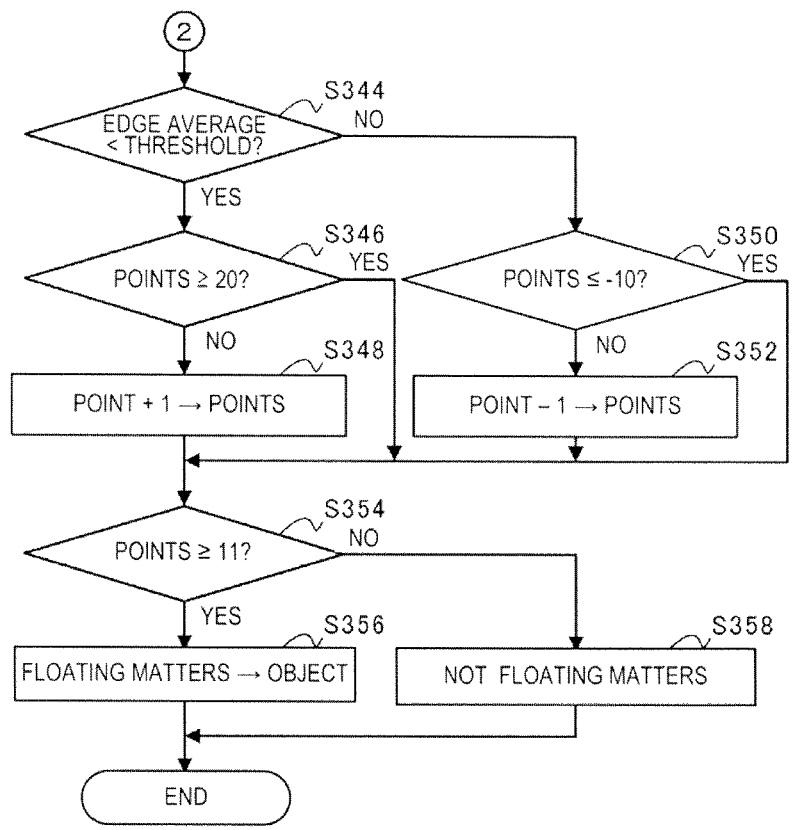

FIGS. 7 to 9 are a flowchart illustrating a flow of the entire processing of a method of recognizing a vehicle external environment according to this example. This method of recognizing the vehicle external environment is performed frame by frame. As first illustrated in FIG. 7, the image processing module 160 acquires the image data from each of the two imaging devices 110 and derives the parallax information using the pattern matching to generate the distance image 212 associated with the image data (S300). The 3D position deriving module 162 derives 3D positions of a plurality of subject parts in real space, in the images of the detection area 214 (S302). Next, the object identifying module 164 groups the subject parts of which differences in the 3D position are within a predetermined range to identify an object (S304).

Next, the judgment part determining module 166 determines judgment parts to be used for the edge intensity determination, for the object identified by the object identifying module 164 (S306). Next, the edge intensity deriving module 168 derives an edge average which is an average value of the edge intensities of the plurality of predetermined judgment parts of the object. Specifically, the edge intensity deriving module 168 selects one strip 224 from each of the divided areas 222a, 222b and 222c and then selects one pixel 230 of the selected strip 224 (S308).

Referring next to FIG. 8, the edge intensity deriving module 168 determines whether the selected pixel 230 in the left end divided area 222a is an edge (S310). If the selected pixel 230 is an edge (YES at S310), the edge intensity deriving module 168 derives an edge intensity of this pixel 230 using a Laplacian filter (S312). The edge intensity deriving module 168 then integrates the edge intensities in this divided area 222a (S314). On the other hand, if the selected pixel 230 is not an edge (NO at S310), the edge intensity deriving module 168 transits the processing to the next divided area 222b.

Next, the edge intensity deriving module 168 determines whether the selected pixel 230 in the center divided area 222b is an edge (S316). If the selected pixel 230 is an edge (YES at S316), the edge intensity deriving module 168 derives an edge intensity of this pixel 230 using a Laplacian filter (S318). Then, the edge intensity deriving module 168 integrates the edge intensities in this divided area 222b (S320). On the other hand, if the selected pixel 230 is not an edge (NO at S316), the edge intensity deriving module 168 transits the processing to the next divided area 222c.

Next, the edge intensity deriving module 168 determines whether the selected pixel 230 in the right end divided area 222c is an edge (S322). If the selected pixel 230 is an edge (YES at S322), the edge intensity deriving module 168 derives an edge intensity of this pixel 230 using a Laplacian filter (S324). Then, the edge intensity deriving module 168 integrates the edge intensities in this divided area 222c (S326). On the other hand, if the selected pixel 230 is not an edge (NO at S322), the edge intensity deriving module 168 transits the processing to a pixel end determination step (S328).

Next, the edge intensity deriving module 168 determines whether the above-described processing has been finished for all the pixels 230 in the selected strip 224 (S328). If the processing has not been finished (NO at S328), the edge intensity deriving module 168 selects the next pixel 230 in the same strip 224 (S330), and repeats the processing from the edge determination processing (S310). On the other hand, if the processing has been finished (YES at S328), the edge intensity deriving module 168 transits the processing to a divided area end determination step (S332).

The edge intensity deriving module 168 determines whether the above-described processing has been finished for all the strips 224 in each of the divided areas 222a, 222b and 222c (S332). If the processing has not been finished (NO at S332), the edge intensity deriving module 168 selects the next strip 224 in each of the divided areas 222a, 222b and 222c (S334), and then repeats the processing from the edge determination processing (S310). If the processing has been finished (YES at S332), the edge intensity deriving module 168 divides the integrated edge intensity for each of the divided areas 222a, 222b and 222c by the number of pixels 230 (here, 625 pixels) to derives the edge average (S336).

Next, the edge intensity deriving module 168 determines whether the above-described edge average is derived for the three frames (S338). If the edge average for the three frames is derived (YES at S338), the edge intensity deriving module 168 then concludes the median of the edge averages derived for the three frames (previous, current and next frames) to be an edge average of the current frame using a median filter, and stores the edge average of the current frame to be used for the next median filter (S340). On the other hand, if the edge average for the three frames is not derived (NO at S338), the edge intensity deriving module 168 uses the edge average derived for the current frame as it is (S342).

Referring next to FIG. 9, the floating matter identifying module 170 compares the edge average with a predetermined threshold (S344). If the edge average is less than the threshold (YES at S344), the floating matter identifying module 170 then determines whether the integrated point is 20 points or greater (S346). If the integrated point is less than 20 points (NO at S346), the floating matter identifying module 170 adds 1 point to the integrated point (S348). On the other hand, if the integrated point is 20 points or greater (YES at S346), the floating matter identifying module 170 transits the processing to floating matter determination processing (S354).

If the edge average is equal to or greater than the threshold (NO at S344), the floating matter identifying module 170 then determines whether the integrated point is −10 points or less (S350). If the integrated point is greater than −10 points (NO at S350), the floating matter identifying module 170 subtracts 1 point from the integrated point (S352). On the other hand, if the integrated point is −10 points or less (YES at S350), the floating matter identifying module 170 transits the processing to the floating matter determination processing (S354).

Next, the floating matter identifying module 170 determines whether the integrated point is 11 points or greater (S354). If the integrated point is 11 points or greater (YES at S354), the floating matter identifying module 170 identifies the object to be likely floating matters (S356). On the other hand, if the integrated point is less than 11 points (NO at S354), the floating matter identifying module 170 identifies the object not to be floating matters (S358).

As described above in this example, it is possible to accurately detect the floating matters, such as steam and/or exhaust gas, according to the edge intensities of the object, even when the variation in distance of subject parts of the floating matters is small or the floating matters are illuminated to have colors or reflect colored lights.

Note that one or more programs which cause a computer to function as the vehicle exterior environment recognition device 120, or one or more storage media, such as flexible discs, magneto-optic discs, ROMs, CDs, DVDs, BDs, which record the programs and can be read by the computer, may also be provided. Note that the term "program" as used herein refers to a data set that is described by any languages and/or any describing methods.

As described above, although the suitable example of the present disclosure is described with reference to the accompanying drawings, the present disclosure is not limited to this example. It is apparent that a person skilled in the art can comprehend various kinds of changes and/or modifications within the scope of the appended claims, and it should be understood that those derivatives also encompass the technical scope of the present disclosure.

For example, the floating matters are identified according to the edge intensities of the object in the example described above. However, the technique to identify the floating matters according to the variation (distribution) in the distance of subject parts of one object with respect to the average value of the distances of the subject parts of the object as disclosed in JP-A No. 2009-110168, and/or the technique to identify the floating matters based on any one or more characteristic amounts of the average value, variance, skewness, and kurtosis of the luminance, obtained from the histogram of the luminance of the object as disclosed in JP-A No. 2012-243049, may additionally be used with the technique of this example to identify the floating matters based on the overall evaluations. Therefore, the accuracy of the identification of the floating matters can further be improved.

Note that it is not necessary to perform the processes or steps of the method of recognizing the vehicle external environment in this description in a time series in accordance with the order described in the flowchart, and the processes may also include one or more parallel processes and/or subroutines.

The present disclosure can be applied to the vehicle external environment recognition device which identifies the specific object to which the object existing within the detection area corresponds.

The invention claimed is:

1. A vehicle external environment recognition device, comprising:
a three-dimensional position deriving module that derives three-dimensional positions in real space of a plurality of subject parts in images that are obtained by imaging a detection area;
an object identifying module that groups the subject parts of which differences in the three-dimensional position are within a predetermined range to identify an object;
an edge intensity deriving module that horizontally divides an area containing the object to set a plurality of divided areas, and derives an edge average that is an average value of edge intensities based on a luminance value of each pixel within each of the divided areas; and
a floating matter identifying module that compares the edge average with a predetermined threshold, and identifies the object to be likely floating matters when the edge average is less than the threshold.

2. The vehicle external environment recognition device of claim 1, wherein the edge intensity deriving module derives the edge average based on the luminance value of each pixel within a plurality of predetermined judgment parts that are set within the divided area, and the plurality of predetermined judgment parts are continuous in horizontal directions and offset toward a horizontal end side of the object, while being equally separated from each other in vertical directions.

3. The vehicle external environment recognition device of claim 2, wherein each of the predetermined judgment parts is a pixel, and
wherein the edge intensity deriving module derives the edge intensity using a Laplacian filter of a pixel corresponding to the predetermined judgment part and two adjacent pixels adjacent to the predetermined judgment part on the left side and two adjacent pixels adjacent to the predetermined judgment part on the right side, the predetermined judgment parts being continuous in horizontal directions.

4. The vehicle external environment recognition device of claim 1, wherein the edge intensity deriving module derives the edge average frame by frame, and concludes a median of the edge averages of three consecutive frames that is calculated using median filters, to be the edge average to be used by the floating matter identifying module.

5. The vehicle external environment recognition device of claim 2, wherein the edge intensity deriving module derives the edge average frame by frame, and concludes a median of the edge averages of three consecutive frames that is calculated using median filters, to be the edge average to be used by the floating matter identifying module.

6. The vehicle external environment recognition device of claim 3, wherein the edge intensity deriving module derives the edge average frame by frame, and concludes a median of the edge averages of three consecutive frames that is calculated using median filters, to be the edge average to be used by the floating matter identifying module.

7. A vehicle external environment recognition device comprising circuitry configured to:
drive three-dimensional positions in real space of a plurality of subject parts in images that are obtained by imaging a detection area;
group the subject parts of which differences in the three-dimensional position are within a predetermined range to identify an object;
horizontally divide an area containing the object to set a plurality of divided areas, and derive an edge average that is an average value of edge intensities based on a luminance value of each pixel within each of the divided areas; and
compare the edge average with a predetermined threshold, and identify the object to be likely floating matters when the edge average is less than the threshold.

8. The vehicle external environment recognition device of claim 7, wherein the circuitry is further configured to derive the edge average based on the luminance value of each pixel within a plurality of predetermined judgment parts that are set within the divided area, and the plurality of predetermined judgment parts are continuous in horizontal directions and offset toward a horizontal end side of the object, while being equally separated from each other in vertical directions.

9. The vehicle external environment recognition device of claim 8, wherein each of the predetermined judgment parts is a pixel, and wherein the circuitry is configured to derive the edge intensity using a Laplacian filter of a pixel corresponding to the predetermined judgment part and two adjacent pixels adjacent to the predetermined judgment part on the left side and two adjacent pixels adjacent to the predetermined judgment part on the right side, the predetermined judgment parts being continuous in horizontal directions.

10. The vehicle external environment recognition device of claim 7, wherein the circuitry is further configured to derive the edge average frame by frame, and conclude a median of the edge averages of three consecutive frames that is calculated using median filters, to be the edge average.

11. The vehicle external environment recognition device of claim 8, wherein the circuitry is further configured to derive the edge average frame by frame, and conclude a median of the edge averages of three consecutive frames that is calculated using median filters, to be the edge average.

12. The vehicle external environment recognition device of claim 9, wherein the circuitry is further configured to derive the edge average frame by frame, and conclude a median of the edge averages of three consecutive frames that is calculated using median filters, to be the edge average.

\* \* \* \* \*